United States Patent
Oh et al.

(10) Patent No.: US 9,360,555 B2
(45) Date of Patent: Jun. 7, 2016

(54) APPARATUS AND METHOD FOR COMPENSATING FOR BEAM ANGLE OF MULTI-LAYER LIDAR

(71) Applicant: Hyundai Motor Company, Seoul (KR)

(72) Inventors: Young Chul Oh, Gyeonggi-do (KR); Myung Seon Heo, Seoul (KR); Kyung Ho Yoo, Seoul (KR)

(73) Assignee: Hyundai Motor Company, Seoul (KR)

( * ) Notice: Subject to any disclaimer, the term of this patent is extended or adjusted under 35 U.S.C. 154(b) by 390 days.

(21) Appl. No.: 14/136,377

(22) Filed: Dec. 20, 2013

(65) Prior Publication Data

US 2015/0103331 A1    Apr. 16, 2015

(30) Foreign Application Priority Data

Oct. 10, 2013 (KR) .................. 10-2013-0120531

(51) Int. Cl.
| | |
|---|---|
| *G01C 3/08* | (2006.01) |
| *G01S 17/93* | (2006.01) |
| *G01S 7/48* | (2006.01) |
| *G01S 7/497* | (2006.01) |

(52) U.S. Cl.
CPC ............ *G01S 17/936* (2013.01); *G01S 7/4802* (2013.01); *G01S 7/4972* (2013.01)

(58) Field of Classification Search
CPC .... G01S 17/936; G01S 7/4972; G01S 7/4802
USPC .......................................... 342/70; 356/5.01
See application file for complete search history.

(56) References Cited

U.S. PATENT DOCUMENTS

| | | | | |
|---|---|---|---|---|
| 6,026,353 A | * | 2/2000 | Winner ................. | G01S 7/4026 342/70 |
| 2005/0024261 A1 | | 2/2005 | Fujita | |
| 2010/0235129 A1 | * | 9/2010 | Sharma ................ | G01S 7/4972 702/97 |
| 2011/0156955 A1 | * | 6/2011 | Jeong .................... | G01S 13/931 342/359 |
| 2012/0235851 A1 | * | 9/2012 | Park ...................... | G01S 7/4026 342/70 |

FOREIGN PATENT DOCUMENTS

| | | |
|---|---|---|
| JP | 09-318331 | 12/1997 |
| JP | 2005049310 A | 2/2005 |
| JP | 2007-298303 A | 11/2007 |
| KR | 10-2012-0106142 A | 9/2012 |
| KR | 10-2013-0000202 | 1/2013 |
| KR | 10-2013-0066184 | 6/2013 |

* cited by examiner

*Primary Examiner* — Mark Hellner
(74) *Attorney, Agent, or Firm* — Mintz Levin Cohn Ferris Glovsky and Popeo, P.C.; Peter F. Corless

(57) ABSTRACT

An apparatus for compensating for a beam angle of a multi-layer LiDAR includes: a beam angle calculation unit configured to calculate a distance d calculated by using ground data detected by a ground data detection unit and a beam angle of the multi-layer LiDAR by using a mounting height of the multi-layer LiDAR stored in a storage unit. When the beam angle calculated by a beam angle calculation unit is in a threshold range, a beam angle selection unit selects the calculated beam angle as the beam angle, when a beam angle compensation unit compensates for the initial beam angle by using the beam angle selected by the beam angle selection unit.

6 Claims, 3 Drawing Sheets

APPARATUS AND METHOD FOR COMPENSATING FOR BEAM ANGLE OF MULTI-LAYER LIDAR

CROSS-REFERENCE TO RELATED APPLICATION

This application is based on and claims under 35 U.S.C. §119(a) priority from Korean Patent Application No. 10-2013-0120531, filed on Oct. 10, 2013 in the Korean Intellectual Property Office, the disclosure of which is incorporated herein in its entirety by reference.

BACKGROUND (a) Field of the Invention

The present invention relates to an apparatus and a method for compensating for a beam angle of a multi-layer LiDAR, and more particularly, to a technology of compensating for a changed beam angle when a beam angle of a multi-layer LiDAR mounted in front of a vehicle is changed, in order to provide accurate and high-density three-dimensional geo-spatial information.

(b) Description of the Related Art

Recently, the number of vehicles in which light detection and ranging (LiDAR) is mounted has increased. Based on information acquired from the LiDAR mounted in the vehicle, an electronic control unit of the vehicle may calculate a distance between a driver's vehicle and objects around the vehicle, a relative velocity, and an angle.

A vehicle in which LiDAR is mounted calculates the distance between the driver's vehicle and objects around the vehicle, the relative velocity, the angle, and the like, to be able to provide various safety functions or convenient functions.

For example, a collision prevention function during parking/stopping, a smart cruise function during driving, or an automatic parking function may be performed by figuring out the distance between the driver's vehicle and objects around the vehicle, the angle, or the relative velocity by using information input from the LiDAR which is mounted in the vehicle.

In order for the vehicle to provide various safety functions and convenient functions to a driver, a role of the LiDAR is important and therefore reliability of information input from the LiDAR is also important. However, since the LiDAR is mounted in the vehicle, the vehicle is subjected to various shocks due to driving of the vehicle or various factors, such that the LiDAR may be out of a first mounted angle.

When the LiDAR is out of an appropriate mounting angle, the reliability of the information output from the LiDAR is degraded, and thus the reliability of various functions provided by the vehicle is also degraded.

SUMMARY

The present invention provides an apparatus and a method for compensating for a changed beam angle when a beam angle of a multi-layer LiDAR mounted in front of a vehicle is changed, in order to provide accurate and high-density three-dimensional geo-spatial information to a driver.

In one aspect of the present invention, there is provided an apparatus for compensating for a beam angle of a multi-layer LiDAR, including: a storage unit configured to store a mounting height h and an initial beam angle of the multi-layer LiDAR; a beam receiving unit configured to receive a beam returning after being emitted to a bottom layer; a ground data detection unit configured to detect the beam as ground data when a pulse width of the beam received by the beam receiving unit exceeds a first threshold value and a distance calculated by using the beam exceeding the first threshold value is in a first threshold range; a beam angle calculation unit configured to calculate a distance d calculated by using the ground data detected by the ground data detection unit and the beam angle of the multi-layer LiDAR by using the mounting height of the multi-layer LiDAR stored in the storage unit; a beam angle selection unit configured to select the calculated beam angle as the beam angle when the beam angle calculated by the beam angle calculation unit is in a second threshold range; and a beam angle compensation unit configured to compensate for the initial beam angle by using the beam angle selected by the beam angle selection unit In another aspect of the present invention, there is provided a method for compensating for a beam angle of a multi-layer LiDAR, including: storing, by a storage unit, a mounting height and an initial beam angle of the multi-layer LiDAR; receiving, by a beam receiving unit, a beam returning after being emitted to a bottom layer; detecting, by a ground data detection unit, the beam as ground data when a pulse width of the beam received exceeds a first threshold value and a distance calculated by using the beam exceeding the first threshold value is in a first threshold range; calculating, by a beam angle calculation unit, the beam angle of the multi-layer LiDAR by using a distance d calculated by using the detected ground data and a mounting height h of the multi-layer LiDAR; selecting, by a beam angle selection unit, the calculated beam angle as the beam angle when the calculated beam angle is in a second threshold range; and compensating for, by a beam angle compensation unit, the initial beam angle by using the selected beam angle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
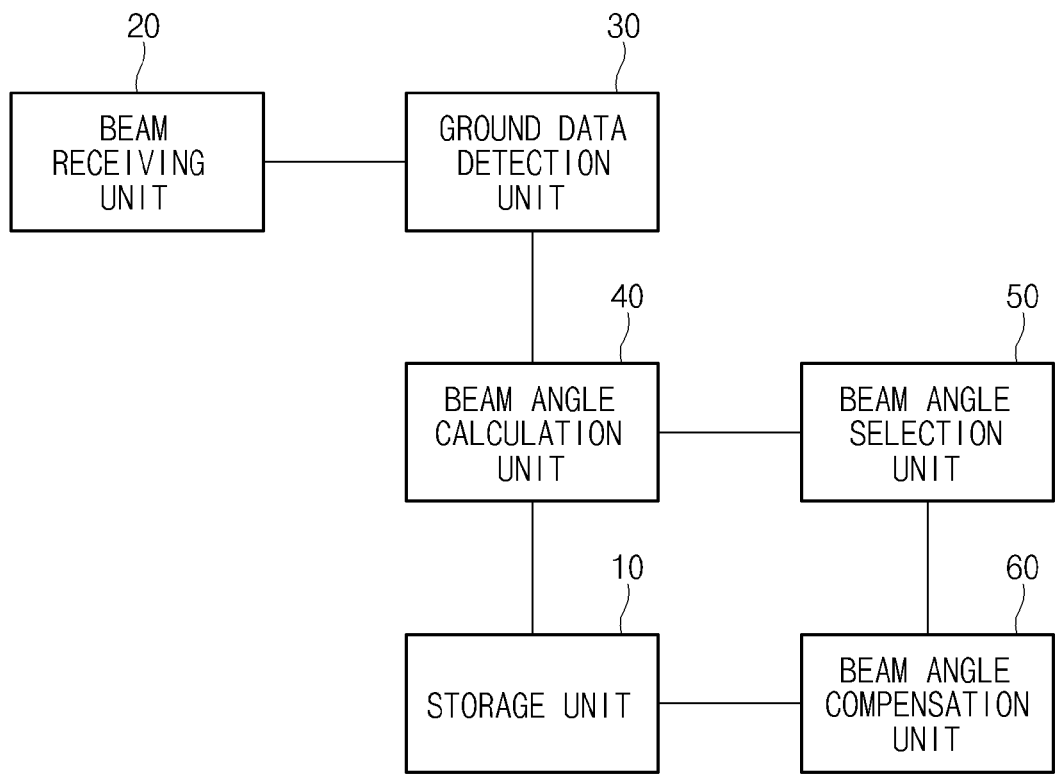
FIG. 1 is a configuration diagram of an apparatus for compensating for a beam angle of a multi-layer LiDAR according to an exemplary embodiment of the present invention.

FIG. 1 is a configuration diagram of an apparatus for compensating for a beam angle of a multi-layer LiDAR according to an exemplary embodiment of the present invention.

As illustrated in FIG. 1, the apparatus for compensating for a beam angle of a multi-layer LiDAR according to the exemplary embodiment of the present invention includes a storage unit 10, a beam receiving unit 20, a ground data detection unit 30, a beam angle calculation unit 40, a beam angle selection unit 50, and a beam angle compensation unit 60. As provided herein, each component preferably is controlled by a control unit (not illustrated) to normally perform its function.

In particular, the storage unit 10 stores a mounting height and a beam angle of a multi-layer LiDAR. In this case, since the mounting height and the beam angle have an initial set value, the multi-layer LiDAR can be firmly fixed by a bracket, and thus the mounting height thereof is not changed, and the beam angle may be distorted due to an impact applied to a vehicle.

As provided herein, the multi-layer LiDAR is preferably a LiDAR which includes a single light emitting unit and a single light receiving unit to sequentially radiate a beam to each layer and then receive the beam returning therefrom; however, a LiDAR which includes each of the light emitting units and the light receiving units which emits the beam to each layer and receives the beam returning therefrom may be used.

Next, the beam receiving unit 20 receives a beam returning after being emitted to a bottom layer (ground).

Next, when a pulse width of the beam received by the beam receiving unit 20 exceeds a first threshold value (for example, 2.0) and a distance calculated by using the beam exceeding the first threshold value is in the first threshold range, the ground data detection unit 30 detects the beam as ground data. However, when any one of the conditions is not satisfied, the ground data detection unit 30 does not detect the beam as the ground data.

As provided herein, the first threshold range indicates a distance range up to a ground measured by the multi-layer LiDAR normally mounted in a vehicle. Further, the ground data detection unit 30 performs primary filtering by using the fact that the pulse width of the beam returning by being reflected from the ground exceeds 2.0 and the pulse width of the beam returning by being reflected from an object is equal to or less than 2.0.

Next, the beam angle calculation unit 40 calculates the beam angle of the multi-layer LiDAR by using the distance calculated by using the ground data (beam) detected by the ground data detection unit 30 and the mounting height of the multi-layer LiDAR stored in the storage unit 10.

Hereinafter, a process of allowing the beam angle calculation unit 40 to calculate the beam angle of the multi-layer LiDAR will be described with reference to FIG. 2.

Figure 2:
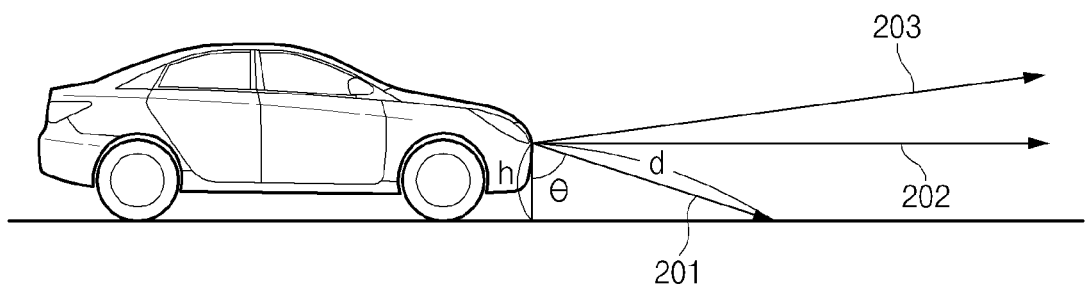
FIG. 2 is an explanatory diagram of a process of allowing a beam angle calculation unit according to an embodiment of the present invention to calculate the beam angle of the multi-layer LiDAR.

As illustrated in FIG. 2, the multi-layer LiDAR sequentially emits the beam to the bottom layer 201, an intermediate layer 202, and a top layer 203. In this case, the beam angle calculation unit 40 calculates the beam angle using the ground data, such that a layer in interest becomes the bottom layer 201.

Since the beam angle calculation unit 40 knows the mounting height of the multi-layer LiDAR by using the storage unit 10 and knows the distance calculated by using the ground data, the beam angle θ of the multi-layer LiDAR may be calculated based on the following [Equation 1]:

$$\cos\theta = h/d$$

$$\theta = \cos^{-1}(h/d). \qquad [\text{Equation 1}]$$

Next, when the beam angle calculated by the beam angle calculation unit 40 is in a second threshold range, the beam angle selection unit 50 selects the calculated beam angle as a beam angle. This is to remove a temporary beam angle due to a prevention chin, and the like. In particular, the temporarily occurring beam angle is removed by performing the filtering process.

Next, the beam angle compensation unit 60 compensates for an initial beam angle by using the beam angle selected by the beam angle selection unit 50. For example, when the initial beam angle is 60° and the current beam angle is 50°, the initial beam angle is modified to 50°.

In addition, when a difference between the initial beam angle and the current beam angle exceeds a reference value, the exemplary embodiment of the present invention may further include a warning unit (not illustrated) which issues warning to a driver.

According to another exemplary embodiment of the present invention, the beam angle compensation unit 60 further includes a motor and a motor driving unit to compensate for the beam angle of the multi-layer LiDAR.

Figure 3:
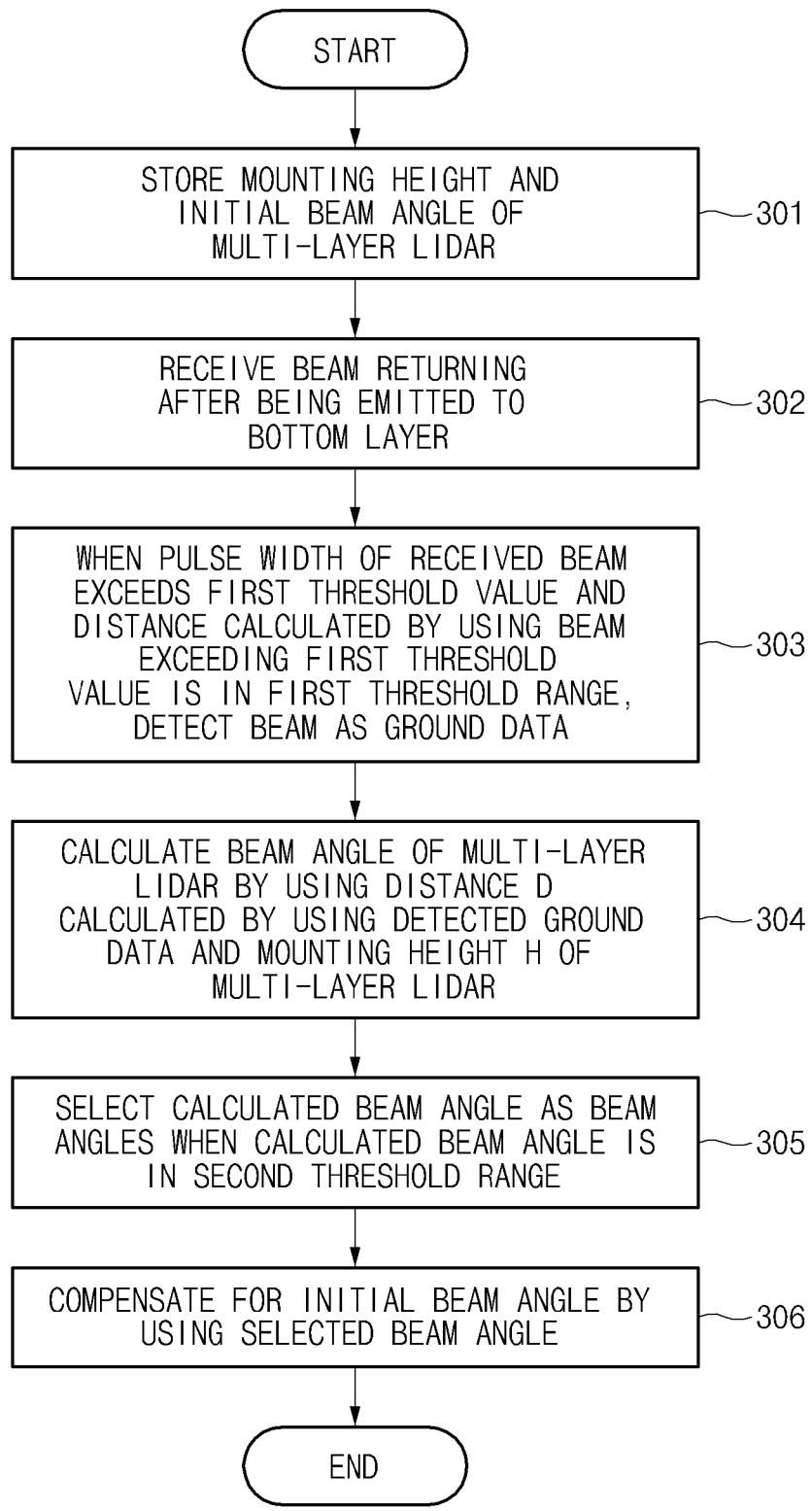
FIG. 3 is a flow chart of a method for compensating for a beam angle of a multi-layer LiDAR according to an exemplary embodiment of the present invention.

FIG. 3 is a flow chart of a method for compensating for a beam angle of a multi-layer LiDAR according to an embodiment of the present invention.

First, the storage unit 10 stores the mounting height and the initial beam angle of the multi-layer LiDAR (301).

Next, the beam receiving unit 20 receives the beam returning after being emitted to the bottom layer (302).

Next, when the pulse width of the beam received by the beam receiving unit 20 exceeds the first threshold value and the distance calculated by using the beam exceeding the first threshold value is in the first threshold range, the ground data detection unit 30 detects the beam as the ground data (303). When any one of the conditions is not satisfied, the ground data detection unit 30 does not detect the beam as the ground data.

Next, the beam angle calculation unit 40 calculates a distance d calculated by using the ground data detected by the ground data detection unit 30 and the beam angle of the multi-layer LiDAR by using a mounting height h of the multi-layer LiDAR (304).

Next, when the beam angle calculated by the beam angle calculation unit 40 is in the second threshold range, the beam angle selection unit 50 selects the calculated beam angle as the beam angle (305).

Next, the beam angle compensation unit 60 compensates for the initial beam angle by using the beam angle selected by the beam angle selection unit 50 (306).

According to the exemplary embodiments of the present invention, by compensating for the changed beam angle when the beam angle of the multi-layer LiDAR mounted in front of the vehicle to provide the accurate and high-density three-dimensional geo-spatial information is changed, the reliable information may be provided to the driver.

As described above, although the present invention has been described with reference to exemplary embodiments and the accompanying drawings, it would be appreciated by those skilled in the art that the present invention is not limited thereto but various modifications and alterations might be made without departing from the scope defined in the following claims.

What is claimed is:

1. An apparatus for compensating for a beam angle of a multi-layer LiDAR, comprising:
    a storage unit configured to store a mounting height h and an initial beam angle of the multi-layer LiDAR;
    a beam receiving unit configured to receive a beam returning after being emitted to a bottom layer;
    a ground data detection unit configured to detect the beam as ground data when a pulse width of the beam received by the beam receiving unit exceeds a first threshold value and a distance calculated by using the beam exceeding the first threshold value is in a first threshold range;
    a beam angle calculation unit configured to calculate a distance d calculated by using the ground data detected by the ground data detection unit and the beam angle of the multi-layer LiDAR by using the mounting height of the multi-layer LiDAR stored in the storage unit;
    a beam angle selection unit configured to select the calculated beam angle as the beam angle when the beam angle calculated by the beam angle calculation unit is in a second threshold range; and
    a beam angle compensation unit configured to compensate for the initial beam angle by using the beam angle selected by the beam angle selection unit.

2. The apparatus according to claim 1, further comprising:
    a warning unit configured to issue warning to a driver when a difference between the beam angle selected by the beam angle selection unit and the initial beam angle exceeds a reference value.

3. The apparatus according to claim 1, wherein the beam angle calculation unit calculates a beam angle θ by using the following [Equation 1]:

$$\theta = \cos^{-1}(h/d).\quad\text{[Equation 1]}$$

4. A method for compensating for a beam angle of a multi-layer LiDAR, comprising:
    storing, by a storage unit, a mounting height and an initial beam angle of the multi-layer LiDAR;
    receiving, by a beam receiving unit, a beam returning after being emitted to a bottom layer;
    detecting, by a ground data detection unit, the beam as ground data when a pulse width of the beam received exceeds a first threshold value and a distance calculated by using the beam exceeding the first threshold value is in a first threshold range;
    calculating, by a beam angle calculation unit, the beam angle of the multi-layer LiDAR by using a distance d calculated by using the detected ground data and a mounting height h of the multi-layer LiDAR;
    selecting, by a beam angle selection unit, the calculated beam angle as the beam angle when the calculated beam angle is in a second threshold range; and
    compensating for, by a beam angle compensation unit, the initial beam angle by using the selected beam angle.

5. The method according to claim 4, further comprising:
    issuing, by a warning unit, warning to a driver when a difference between the selected beam angle and the initial beam angle exceeds a reference value.

6. The method according to claim 4, wherein in the calculating of the beam angle, a beam angle θ is calculated by using the following [Equation 1]:

$$\theta = \cos^{-1}(h/d).\quad\text{[Equation 1]}$$

* * * * *